United States Patent
Steury et al.

(10) Patent No.: US 8,328,286 B2
(45) Date of Patent: Dec. 11, 2012

(54) SELF-LEVELING ARM ASSEMBLY FOR RECLINER

(75) Inventors: Douglas V. Steury, New Paris, IN (US); George Tetzloff, Wolcottville, IN (US)

(73) Assignee: Veada Industries, Inc., New Paris, IN (US)

( * ) Notice: Subject to any disclaimer, the term of this patent is extended or adjusted under 35 U.S.C. 154(b) by 333 days.

(21) Appl. No.: 12/828,639

(22) Filed: Jul. 1, 2010

(65) Prior Publication Data

US 2011/0001345 A1    Jan. 6, 2011

Related U.S. Application Data

(60) Provisional application No. 61/222,522, filed on Jul. 2, 2009.

(51) Int. Cl.
*B60N 2/46* (2006.01)
(52) U.S. Cl. .................................................. 297/411.39
(58) Field of Classification Search ............. 297/411.39, 297/411.2, 411.38, 411.32
See application file for complete search history.

(56) References Cited

U.S. PATENT DOCUMENTS

| | | | |
|---|---|---|---|
| 4,307,913 A | 12/1981 | Spiegelhoff | |
| 4,400,033 A * | 8/1983 | Pietsch | 297/411.39 |
| 4,968,095 A * | 11/1990 | Moyer | 297/411.39 |
| 4,978,170 A * | 12/1990 | Pelz et al. | 297/411.39 |
| 6,361,114 B1 * | 3/2002 | Rumler | 297/411.39 |
| 6,715,836 B1 * | 4/2004 | Chen et al. | 297/411.39 |
| 6,948,776 B1 * | 9/2005 | Harmon et al. | 297/411.39 |
| 7,857,393 B2 | 12/2010 | Cebula et al. | |

* cited by examiner

*Primary Examiner* — Milton Nelson, Jr.
(74) *Attorney, Agent, or Firm* — Michael A. Myers; Shumaker, Loop & Kendrick, LLP (57) ABSTRACT

A self-leveling arm assembly is for use with an article of furniture that includes a back rest portion having an arm support. The back rest portion is connected to a seat portion at a first pivot, wherein the backrest portion is pivotable relative to the seat portion between a forward position and a backward position. The assembly includes an arm and at least one linkage member having a first and a second end. The first end is adapted to be pivotably connected to the seat portion, and the second end carries a cross pin for slidable engagement in a path formed in the aim support. The arm includes a pin at one end. The arm is adapted to be connected to the arm support at the one end to define an area of rotation, which includes rotation of the arm about the pin so that upon simultaneous rotation of the back portion and the linkage member about their respective pivots, the arm experiences vertical displacement, but substantially no angular displacement when the backrest is moved between the forward and the backward positions.

14 Claims, 15 Drawing Sheets

SELF-LEVELING ARM ASSEMBLY FOR RECLINER

REFERENCE TO RELATED APPLICATION

This application claims the benefit of U.S. Provisional Application Ser. No. 61/222,522, filed Jul. 2, 2009, which is hereby incorporated by reference.

BACKGROUND OF THE INVENTION

1. Field of the Invention

The present invention relates to articles of furniture that recline and, more particularly, to a recliner with self-leveling arms.

2. Description of the Background of the Invention

That certain articles of furniture recline is known. It is desirable to provide a chair, for example, with a back rest portion that is adjustable so the seat's occupant can recline accordingly and be comfortable in any position desired. It would be advantageous to have arms on such a recliner about which the back rest portion of the seat could rotate. This would permit the arms to maintain an essentially parallel orientation with the seat of the chair and thus, a useful and comfortable orientation for the occupant, simultaneously with movement of the seat back portion over a useful range of reclining positions. The pivots and areas designed for rotation on such a recliner should be simple without multiple parts that loosen or become detached over time. Individual occupant comfort irrespective of physical size would also be desirable.

Additionally, many modern living spaces, such as those on boats, planes, automobiles, and even homes have limited ability to accommodate a full range of living activities. In order to maximize the use to which a small space is put, it may be preferable that furniture such as seats chairs have arms that are removable. Such a special feature would be desirable for reupholstering jobs as well.

Accordingly, there remains a need for an improved recliner with self-leveling arms. Such a recliner should make efficient use of space, be easy and inexpensive to manufacture, and accommodate small, medium, and large statured individuals.

SUMMARY OF THE INVENTION

The invention provides a self-leveling arm assembly for an article of furniture that includes a back rest portion having an arm support. The backrest portion is connected to a seat portion at a first pivot, such that the backrest portion is pivotable relative to the seat portion between a forward position and a backward position. The assembly of the invention includes an arm and at least one linkage member. The linkage member has a first and second end. The first end is pivotably connected to the seat portion, and the second end carries a cross pin for slidably engagement in a path formed in the arm support. The arm includes a pin at one end.

The arm may include a pin at one end, and the arm is connected to the arm support at the one end to define an area of rotation. The arm may be removable and stored/shipped separately.

The pin may include at least one dowel extending therefrom. The at least one dowel extends under and abuts the cross pin to strengthen support of the arm at all times. The arm support may include a cross pin path slot and an arm pin post hole formed therein.

The linkage member may include a notch between the first and second ends. The notch cradles the pin and the backrest is in the backward position to further strengthen support of the arm.

The arm support may include a cross pin path slot and an arm pin post hole formed in the cross pin path slot.

DETAILED DESCRIPTION OF INVENTION

The invention is a self-leveling arm assembly for a recliner with arms that remain level through a range of reclining angles and are thus self-leveling relative to the seat. The inventive recliner 10 with assembly installed comprises a generally flat seat portion 20, an arm 40, a back rest portion 30 with an arm support 32, and at least one linkage member, which is preferably a straddle floating bar 50. The seat, arm and back rest illustrated in the drawings essentially defines a chair frame useful for boats, planes, trains, automobiles, and homes. Skilled artisans will recognize that the recliner assembly of the invention may be used with any article of furniture where it is desirable to have a reclining back rest, including couches, chairs, chair backs and the like.

The back rest portion 30 is pivotably attached to the seat portion 20 at the first pivot 33. In one embodiment, the back rest portion 30 includes an arm support 32. The arm support may be integrally formed in the back rest portion 30 or the sides of the seat 20. In the embodiment shown, however, the arm support comprises two parallel side brace walls, as shown in FIG. 1A, vertically aligned and attached along at least a portion of their lengths to the body of the back rest portion. The brace walls include an anterior arm pin post hole 37 with a channel 35 formed therein and a posterior cross pin path slot 34, which guides the motion of the cross pin 58 (described below) during movement of the back rest between the forward and the backward position. The arm pin post holes 37 receive the arm pin 42. A stop 64 is formed in the outer brace wall of arm support 32.

Figure 1:
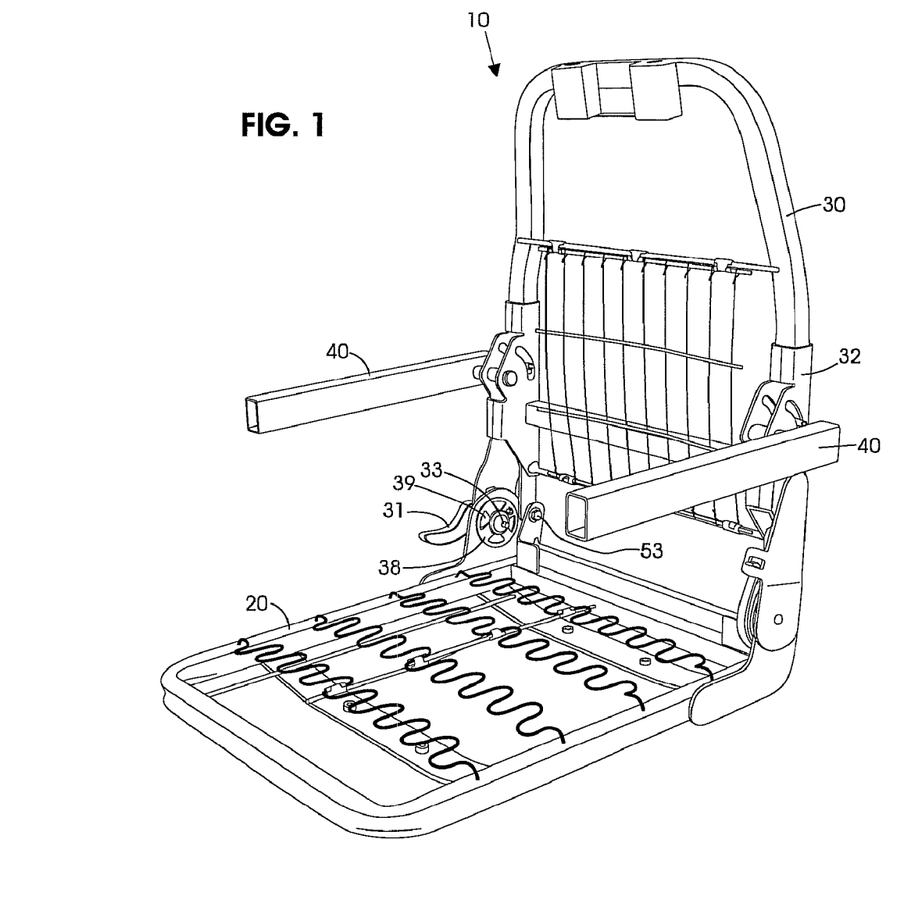
FIG. 1 is an elevated front-side perspective view of an embodiment of the self-leveling arm assembly of the invention.
Figure 1A:
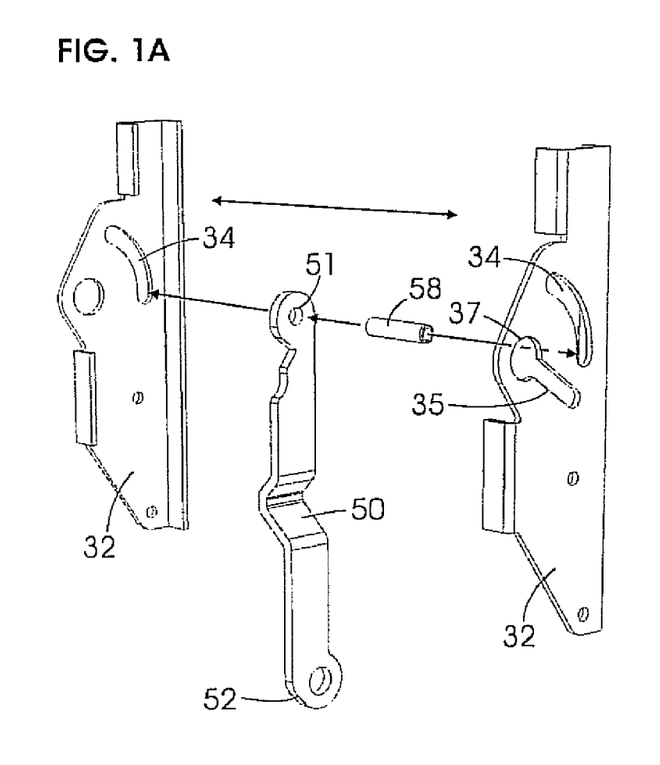
FIG. 1A is an exploded perspective view showing an embodiment of the arm support and linkage member of the invention.
Figure 2:
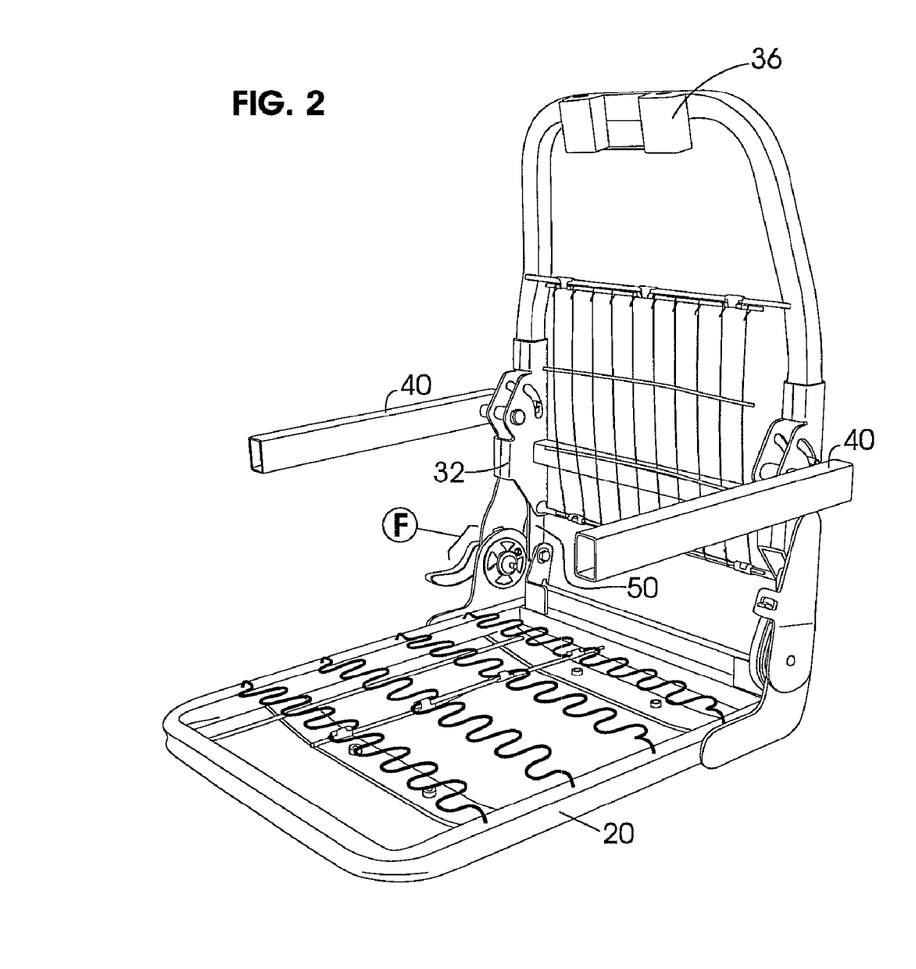
FIG. 2 shows an elevated front-side perspective view of a recliner that includes an embodiment of the self-leveling arm assembly of the invention.
Figure 2A:
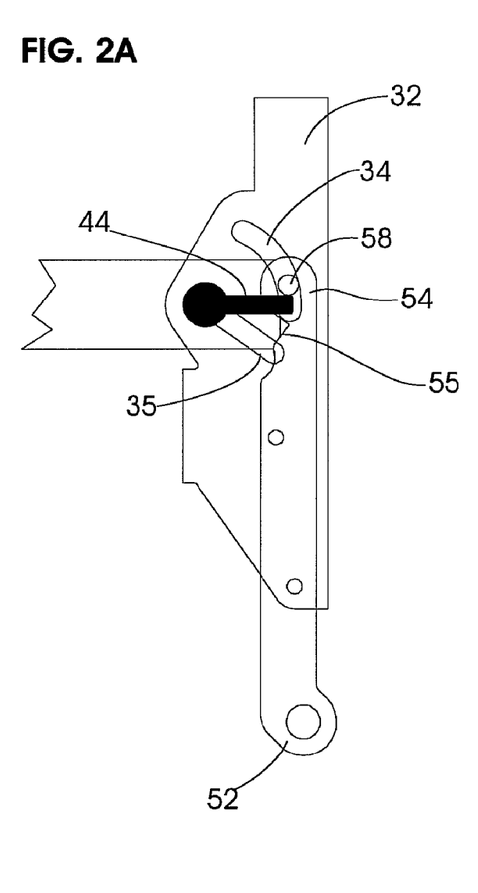
FIG. 2A is a schematic view showing the self-leveling assembly embodiment of FIG. 2 in the forward position.
Figure 2B:
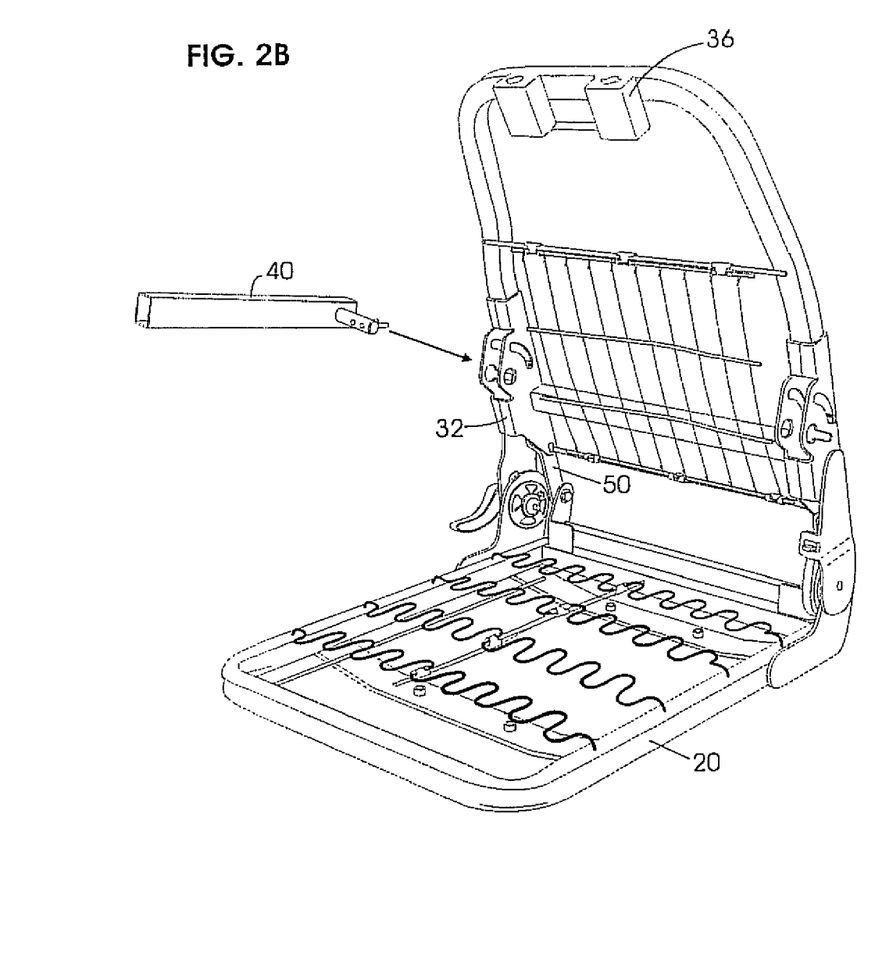
FIG. 2B shows an elevated front-side perspective view of a recliner that includes an embodiment of the self-leveling arm assembly of the invention with the arm removed.
Figure 2C:
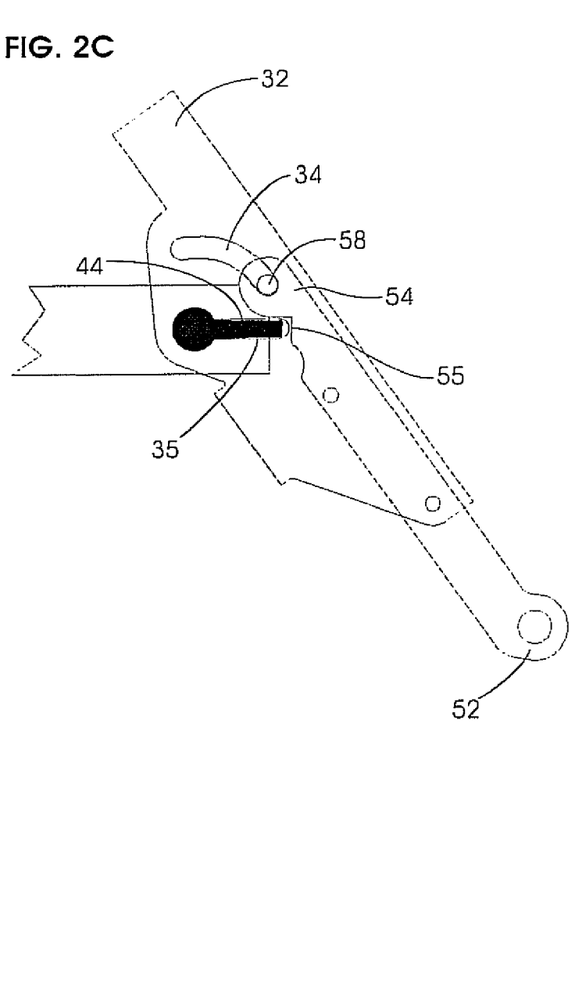
FIG. 2C is a schematic view showing the self-leveling assembly embodiment of FIG. 2B in the forward position.
Figures 2D, 2E:
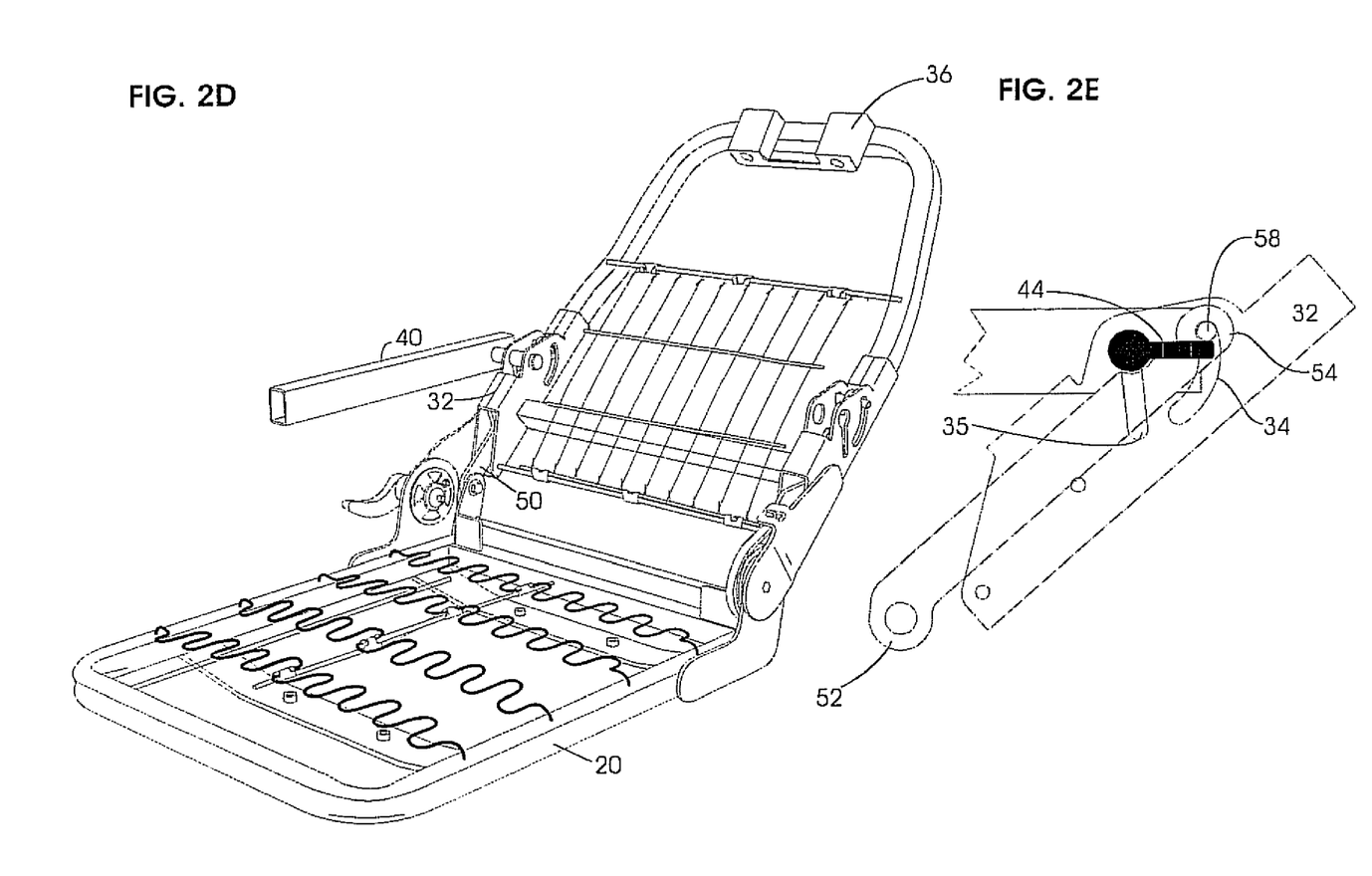
FIG. 2D shows the recliner of FIG. 2 in the backward position.
FIG. 2E is a schematic view showing the embodiment of the self-leveling arm assembly of FIG. 2D in the backward position.
Figure 11:
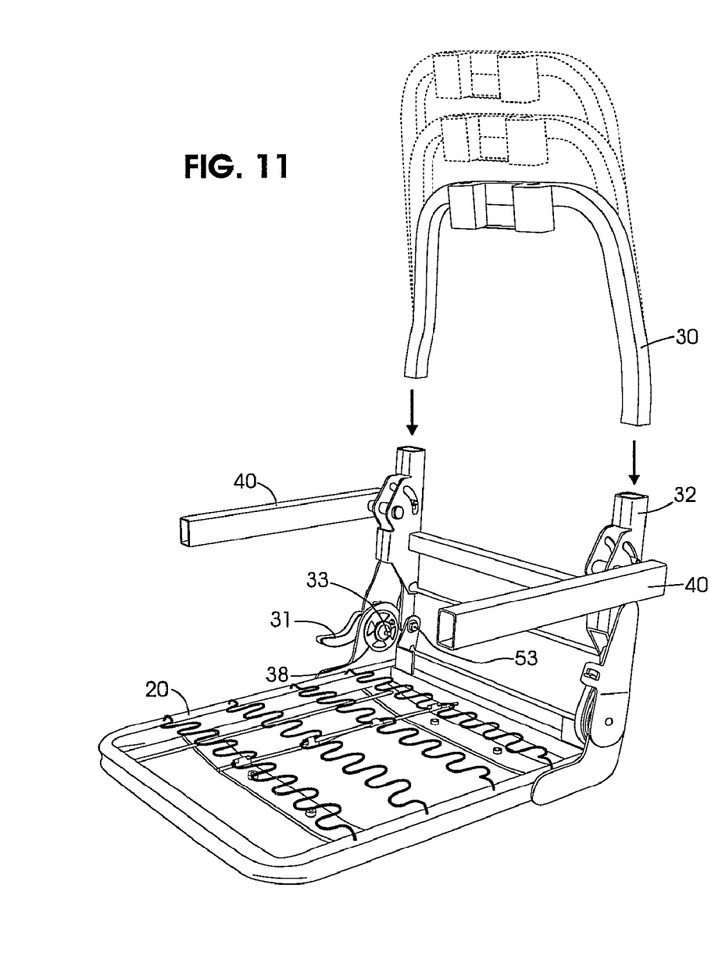
FIG. 11 is a front side perspective view of an embodiment of the recliner assembly of the invention with differently sized back frames shown in phantom.

As illustrated in FIGS. 1 and 11, the first and second pivots 33, 53 are conveniently located near the periphery of the seat portion 20. In one embodiment, the first pivot includes an incremental lock or clutch mechanism F capable of releasably locking the back rest relative to the seat portion 20 at a desired position between the forward and backward positions, which are shown, respectively, in FIGS. 2-2B and 2D. Skilled artisans will recognize that numerous types of available mechanical clutch devices may be employed for this purpose, including motorized clutch assemblies for electronically effecting the movement of the back rest portion 30 between the forward and backward positions. Such electro-mechanical devices may include a keypad (not shown) located in the arm 40 or other suitable location or a hand held transmitter in electronic communication with a motor (not shown), which is connected to the clutch. Such devices should also facilitate the stop-and-go of the back rest's movement such that the assembly 10 functions as described below. In the embodiment illustrated, clutch F includes a handle 31 operable to engage and disengage binding portions 38 of a rotating member 39 connected to the back rest portion 30 from rotating freely to adjust the back portion between the forward and rearward positions.

Figure 1B:
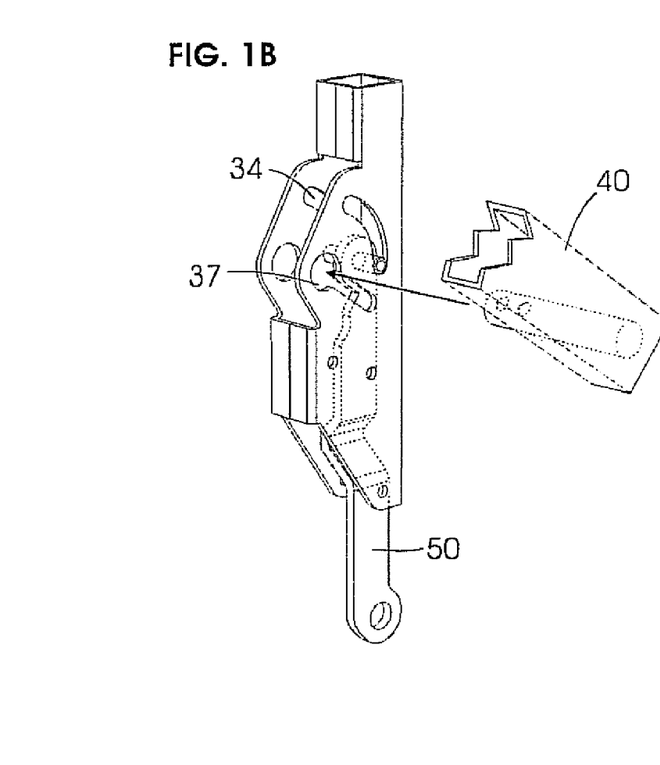
FIG. 1B is another perspective view showing the arm support, a partial cutaway of the arm, and a portion of the linkage member shown in phantom lines.
Figure 1C:
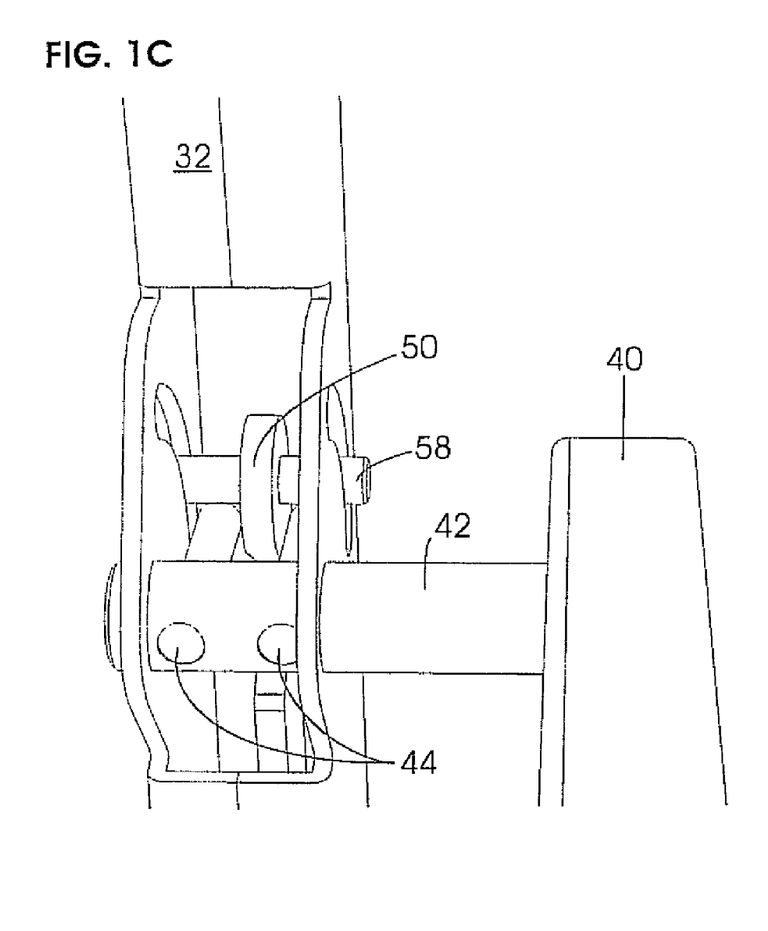
FIG. 1C is an enlarged perspective view showing an embodiment of the arm and arm pin assembled in the arm support.

The assembly includes at least one linkage member, referred to herein as a straddle floating bar 50, as shown in FIGS. 1A-B. The straddle floating bar 50 is pivotably attached at one end 52 to the first pivot 33. The unattached end 54 of the straddle floating bar carries the cross pin 58, which is received translatably in the cross pin slots 34 of the brace walls (See FIG. 1A). In this manner, the cross pin 58 is maintained at a perpendicular orientation to the brace walls 32, but can translate within the confines of the slot 34 as the angle between the seat 20 and the back rest 30 is changed. It should be noted that the first and second pivots 33, 53 can be placed in positions other than peripheral with respect to the seat portion 20, and/or may share a common axle or rotate at the same pivot, as long as the function of the straddle floating bar 50 within the arm support 32 is preserved. Additionally, it is contemplated that the end 52 of floating bar 50 of linkage member, in another embodiment, may be connected to or integral with the clutch F.

Figure 3:
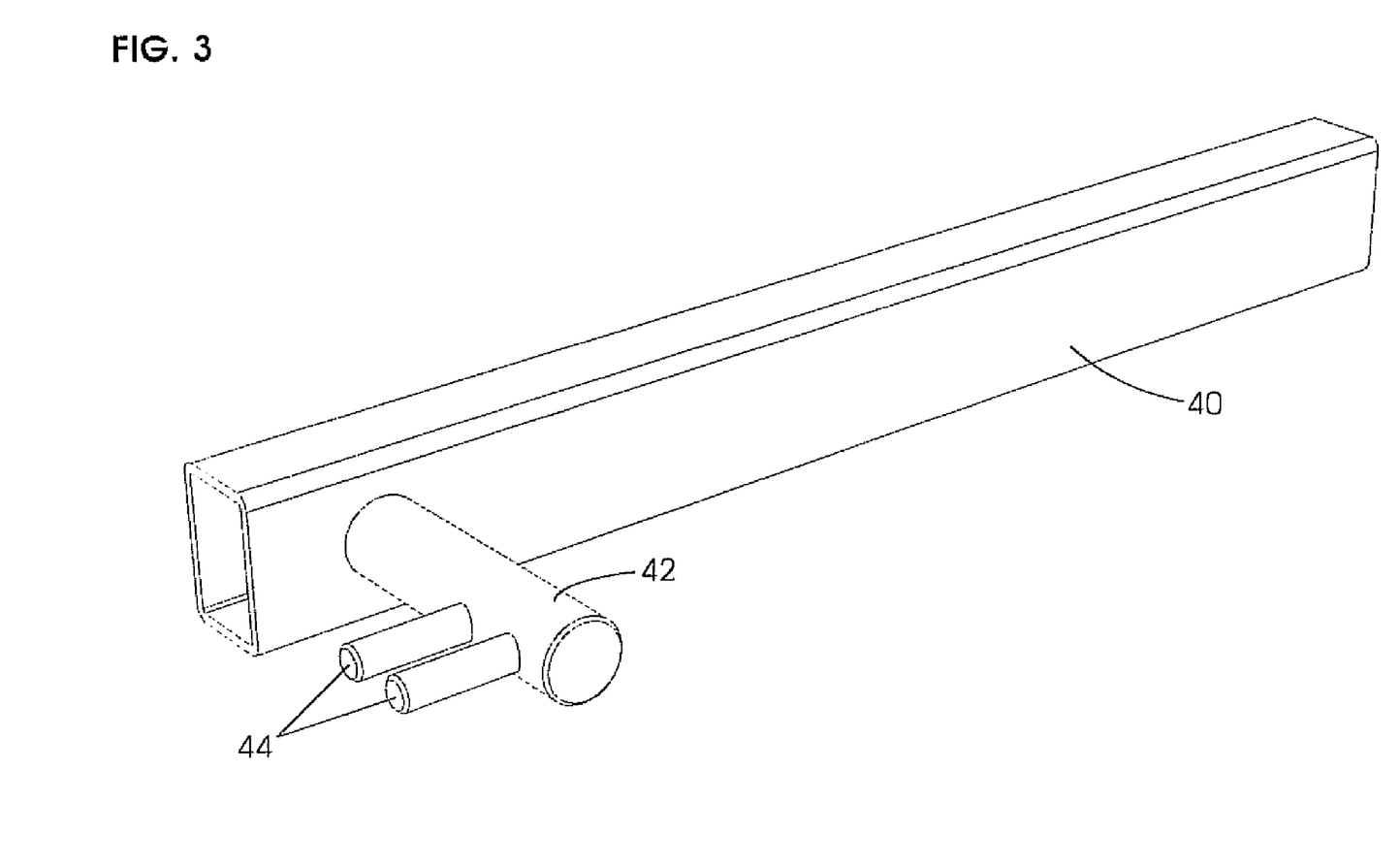
FIG. 3 is an elevated perspective view of an embodiment of the arm.

Referring to FIG. 3, an embodiment of the arm 40 comprises the arm pin 42 which resides rotatably within the post holes 37 in a manner permitting rotation of the arm support 32, e.g., the brace wall, with respect to the arm pin 42 in the manner described. Extending from the arm pin 42 is at least one dowel 44 perpendicular to the arm pin. In a preferred embodiment, two dowels 44 are present. In the context of the assembly, the dowels 44 extend under and abut the cross pin 58, and in a preferred two-dowel configuration, the straddle floating bar 50 is between the dowels. FIG. 3 illustrates a preferred two dowel configuration. The pin and dowels 42, 44 may be integrally cast, machined, or threaded accordingly so there are no moving parts to become detached or loose.

As a result of the configuration outlined above, the act of reclining the chair frame results in simultaneous rotation of the back rest portion 30 and the straddle floating bar 50 about their respective pivots 53, 33, resulting in the control of the translational and angular displacement of the arm 40. In a preferred embodiment, the parameters and, in particular, the cross pin path slots 34 have dimensions such that the arm 40 experiences vertical displacement, but substantially no angular displacement, with degree of recline over a useful range of reclining positions, such as a reclining angle in the range of, between about 50 or 60 degrees to about 160 or 170 degrees, and in other embodiments, on the range of about 90 degrees to about 130 degrees.

Figure 4:
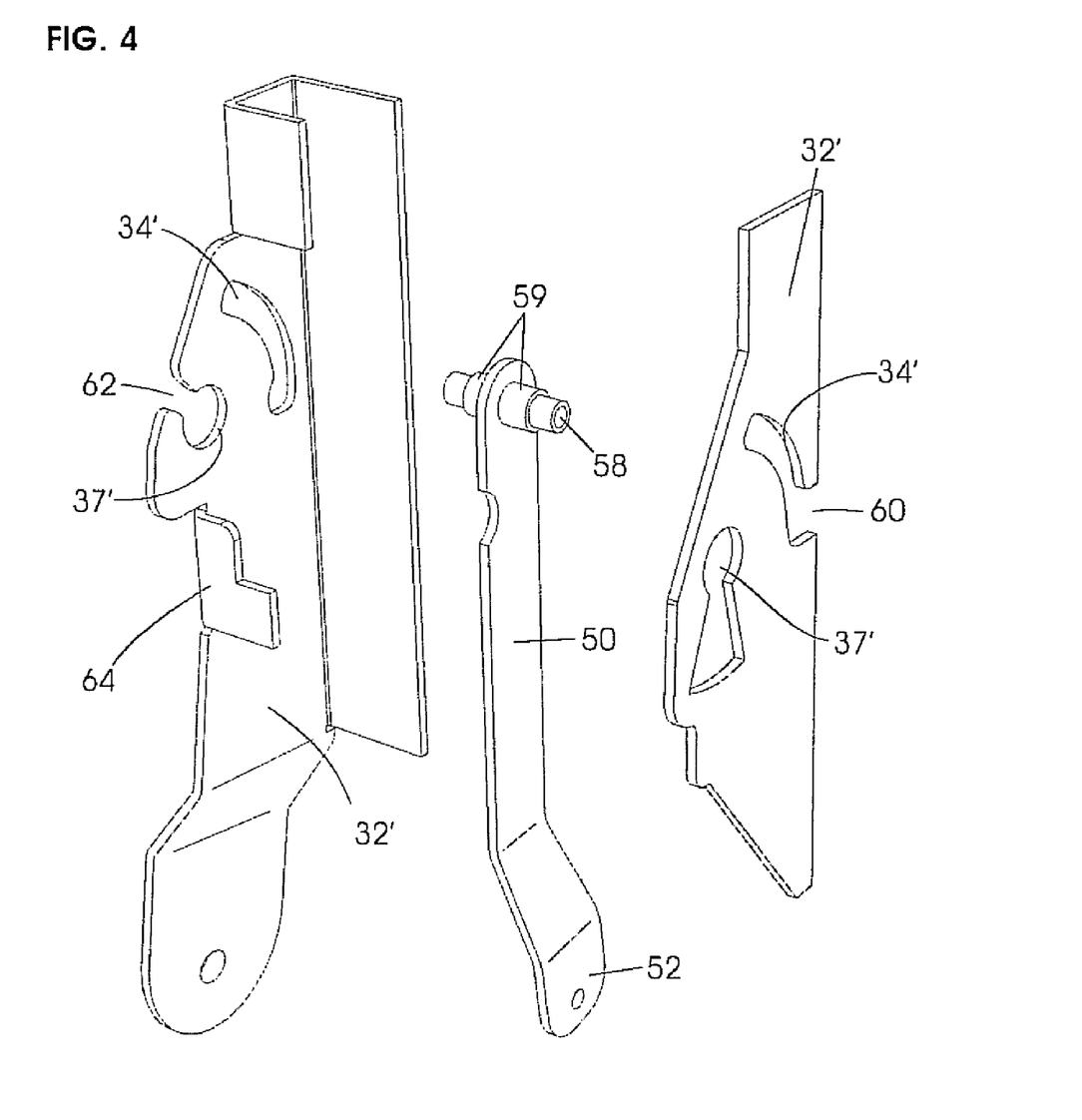
FIG. 4 is a front side exploded perspective view of another embodiment of the arm support of the invention, which facilitates removal of the arms.

In one embodiment, the arm pin post hole 37 on an outer brace wall comprises an insertion slot or channel 35, which is an extension of the post hole 37 and shaped such that it can passably receive the perpendicular dowels 44. In a preferred embodiment (See FIG. 4), the arms 40 can be inserted and removed when the chair is folded forward to a degree. In a preferred embodiment, the straddle floating bar 50 comprises a notch 55 such that the arms can only be inserted when the chair is folded forward to a specific degree. At all other folding angles, including useful reclining angles, see FIGS. 2B and 2D, the notch 55 on the straddle floating bar 50 and the insertion slot 37 are not aligned, and the arms 40 cannot be removed or installed. In another preferred embodiment, the folding position required for arm installation can be accessed by the operation of the clutch F, which is, in that embodiment, located at the first pivot 33. Alternatively, movement of the back rest portion relative to the seat as herein contemplated may be effected by any of several known electro-mechanical means, including a motor and optional local or remote activating devices.

In another embodiment, the arm support 32 may be configured so that the arms may be removed without the use of tools. In that embodiment, shown in FIG. 4, cross pin 58 of the straddle floating bar 50 has two retaining collars 59 pressed onto each side, keeping the cross pin 58 from extending through the curved slots 34' in the inner and outer brace walls of the arm support. When the assembly is in place, the retaining collars 59 prevent any side-to-side movement of the straddle floating bar 50. The dowels 44 of the arms straddle the straddle floating bar 50, as shown in FIGS. 5 and 6, thus keeping the arm from sliding inward and catching in the post hole 37', e.g., keyhole-shaped, on the inner brace wall.

The notch 60 formed in the inner brace wall slot 34' facilitates installation of the straddle floating bar 50, cross pin 58, and collars 59 after the seat assembly is welded together as a unit.

Figure 5:
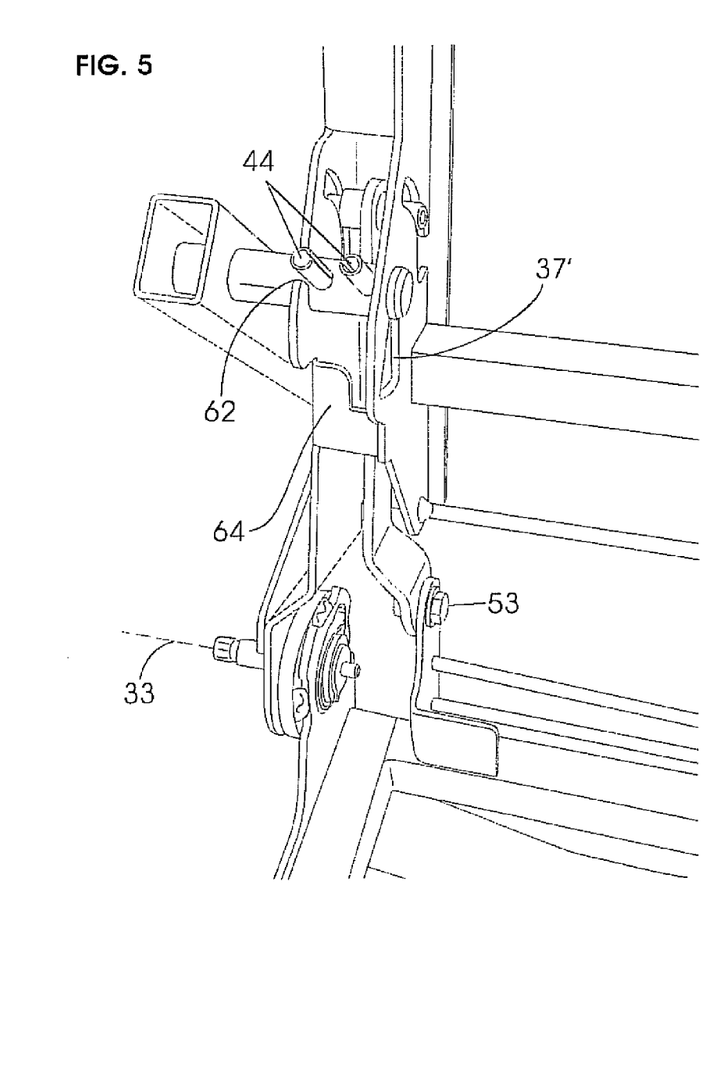
FIG. 5 shows a front-side cutaway perspective view showing the embodiment of the support arm of FIG. 4 assembled in a recliner.
Figure 5A:
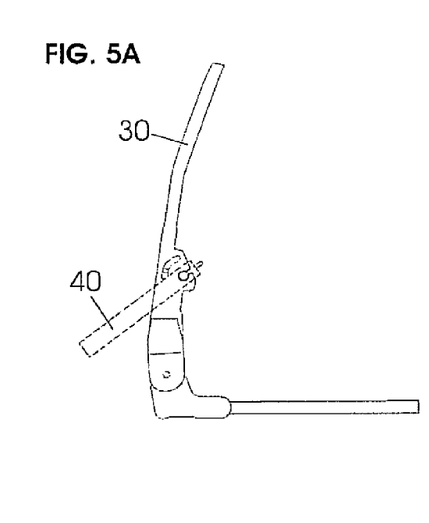
FIG. 5A illustrates the position of the arm of FIG. 5.
Figure 6:
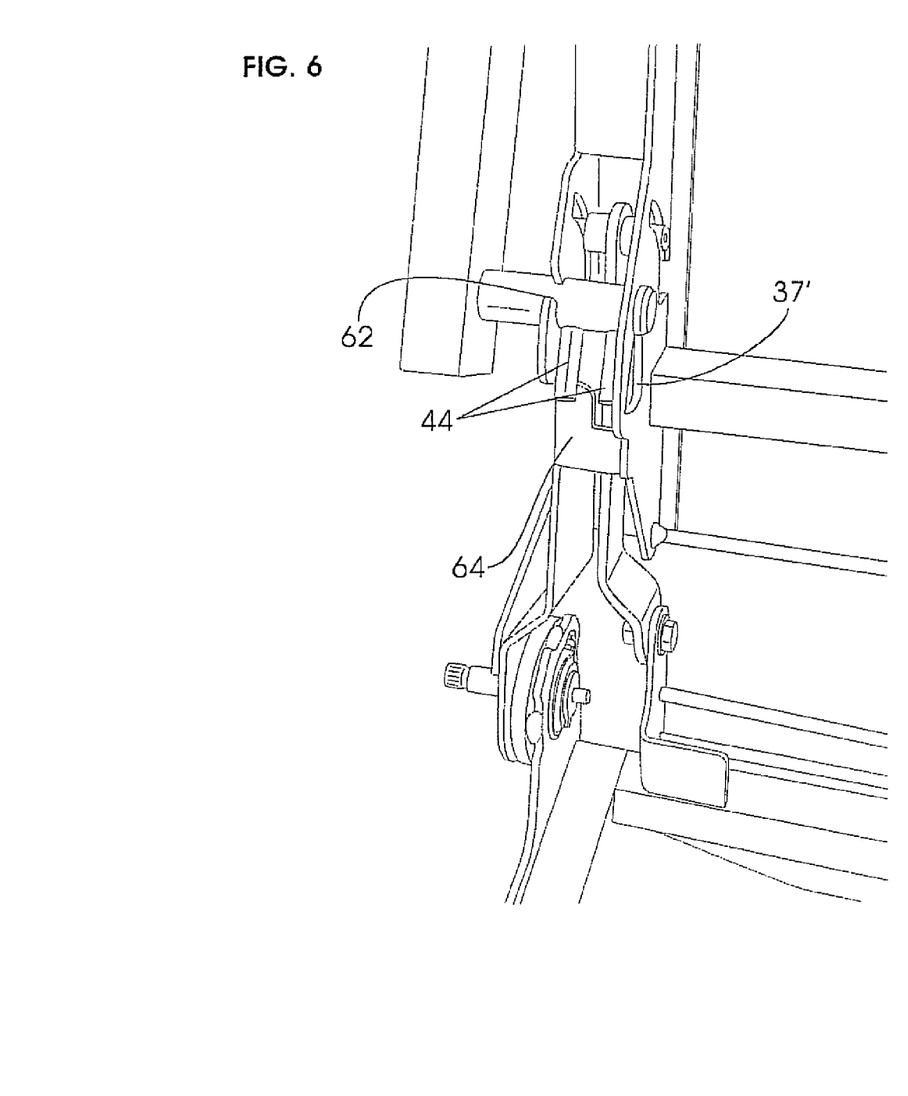
FIG. 6 is another view of the embodiment of the arm support of FIG. 5 in the process of removing the arm.
Figure 6A:
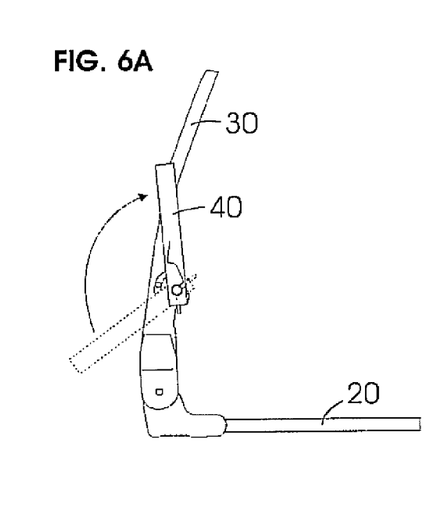
FIG. 6A illustrates the position of the arm during the process of FIG. 6.
Figure 7:
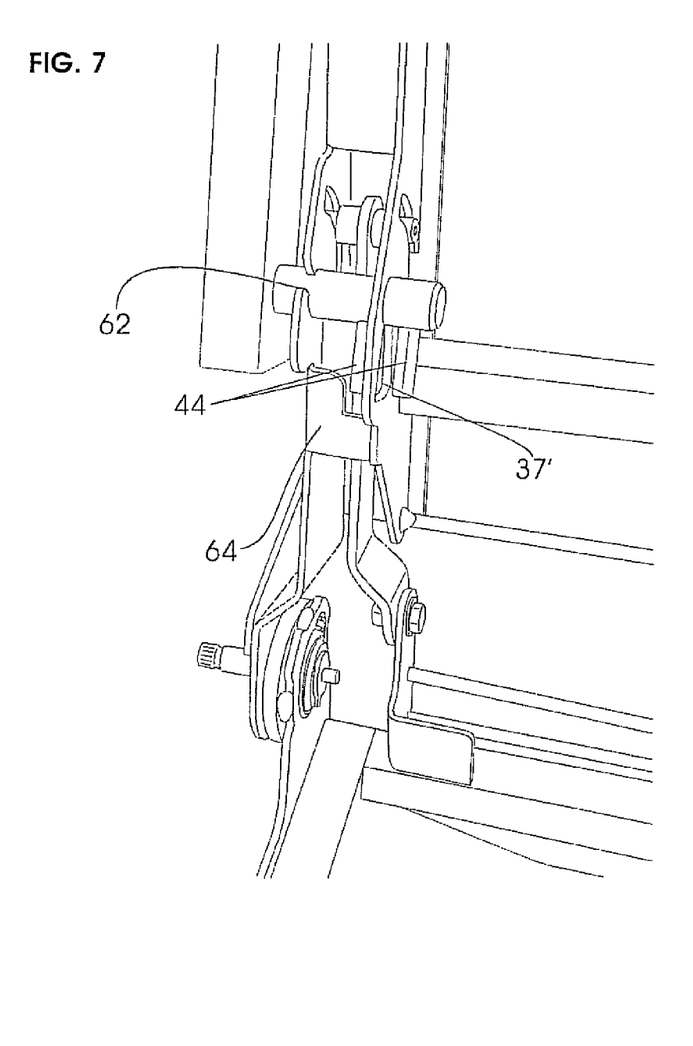
FIG. 7 is another perspective view of the arm support and arm of FIG. 5 further illustrating removal of the arm.
Figure 7A:
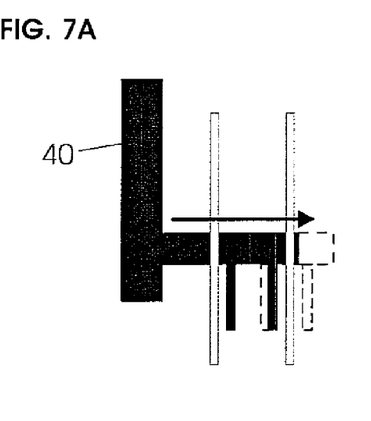
FIG. 7A is a schematic illustration showing the to and fro movement of the arm embodiment of FIG. 7 within the arm support of the invention as the arm is removed therefrom.
Figure 8:
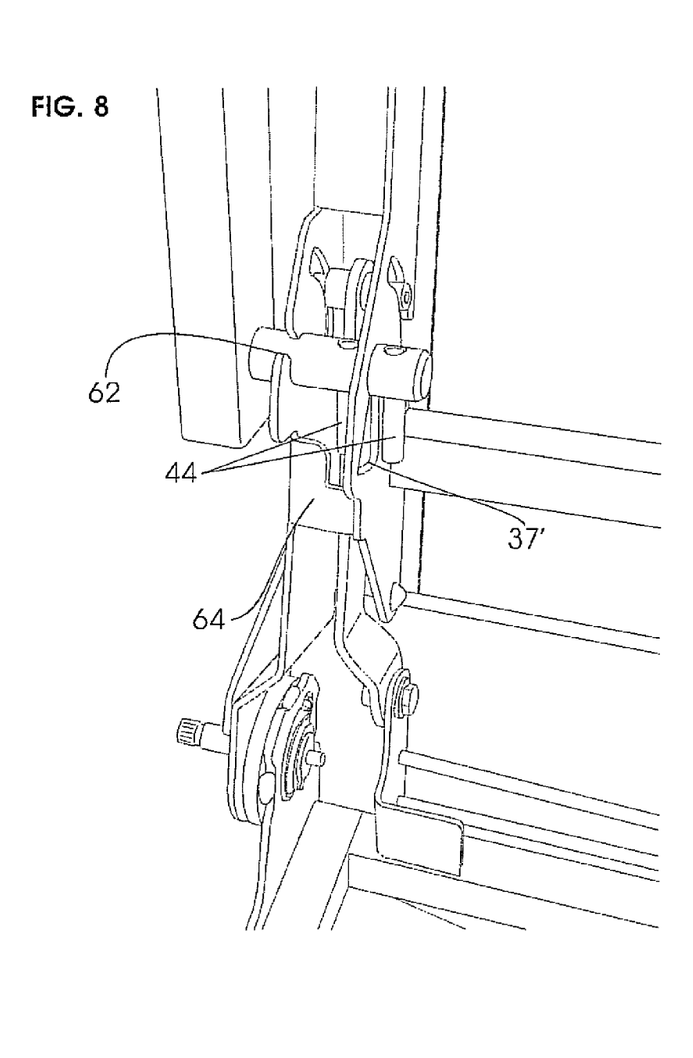
FIG. 8 is still another perspective view showing the installation/removal of the arm of the invention.
Figure 8A:
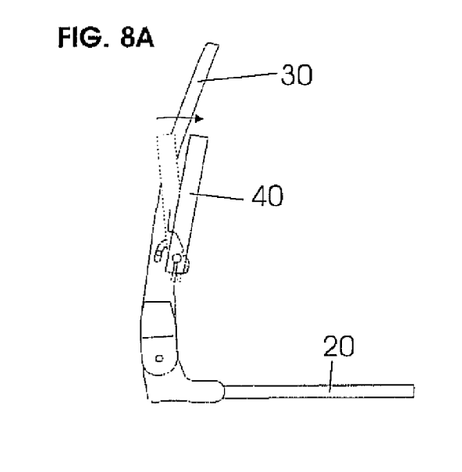
FIG. 8A is a schematic illustration showing the position of the arm about the pin of the embodiment of FIG. 8.

With reference to FIGS. 5-10A, the disassembly of the arms from the article from the recliner will now be described. Dowels 44 slide through slot 62 in the outer brace wall of arm support 32, as shown in FIGS. 5-5A. The arm 40 is rotated upward (FIGS. 6-6A) so that dowels 44 abut stop 64 and are in-line with the keyhole-shaped slot 37' on the inner brace wall. The range of motion followed and the position of arm 40 is shown in FIG. 6A. Referring to FIGS. 7-7A, the arm may be pushed inward on the recliner frame (shown in phantom lines) so that inside dowel 44 is pushed through keyhole shaped slot 37' on the inside of the brace wall. The arm may then be rotated forward a distance great enough to allow the outer dowel 44 to clear stops 64 of brace wall, as shown in FIGS. 8-8A.

Figure 9:
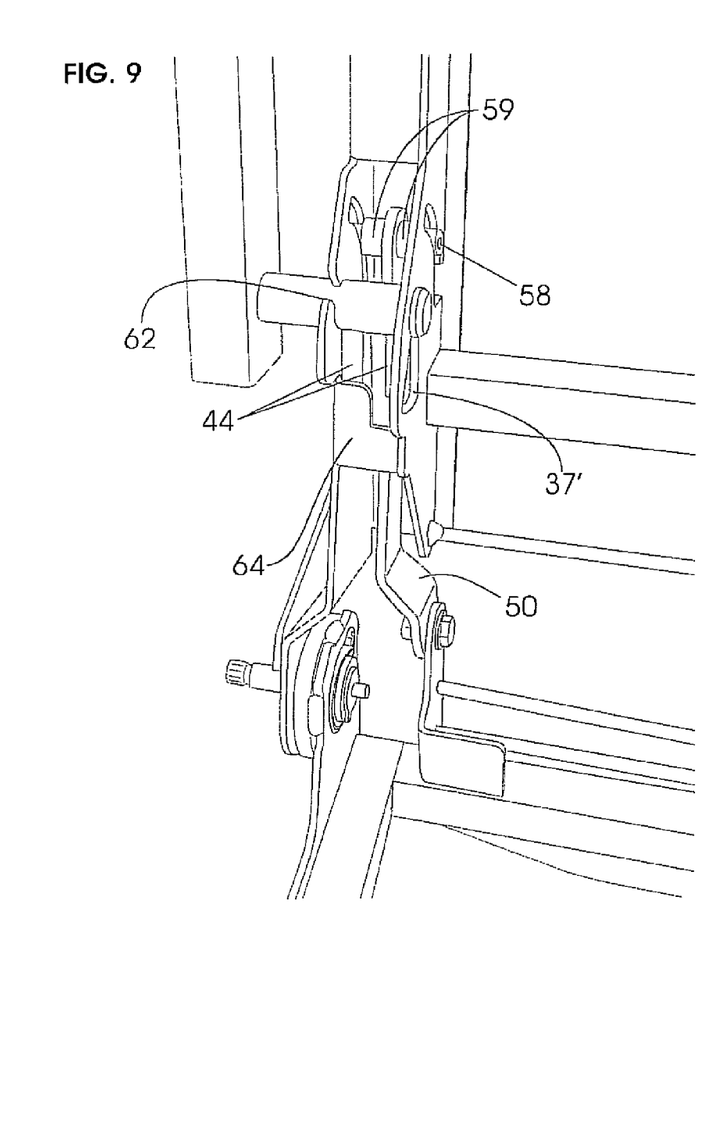
FIG. 9 is another perspective view showing the arm of the invention being removed from the arm support of FIG. 5 of the invention.
Figure 9A:
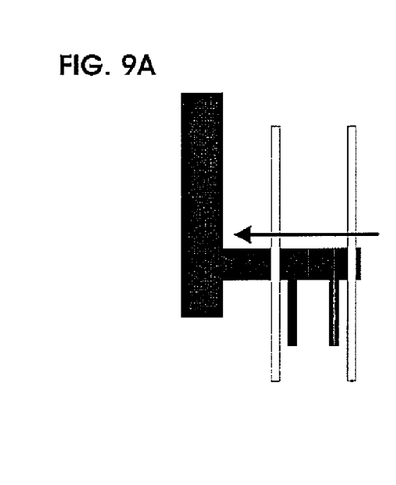
FIG. 9A is a schematic illustration showing the movement of the arm away from the arm support of the invention.
Figure 10:
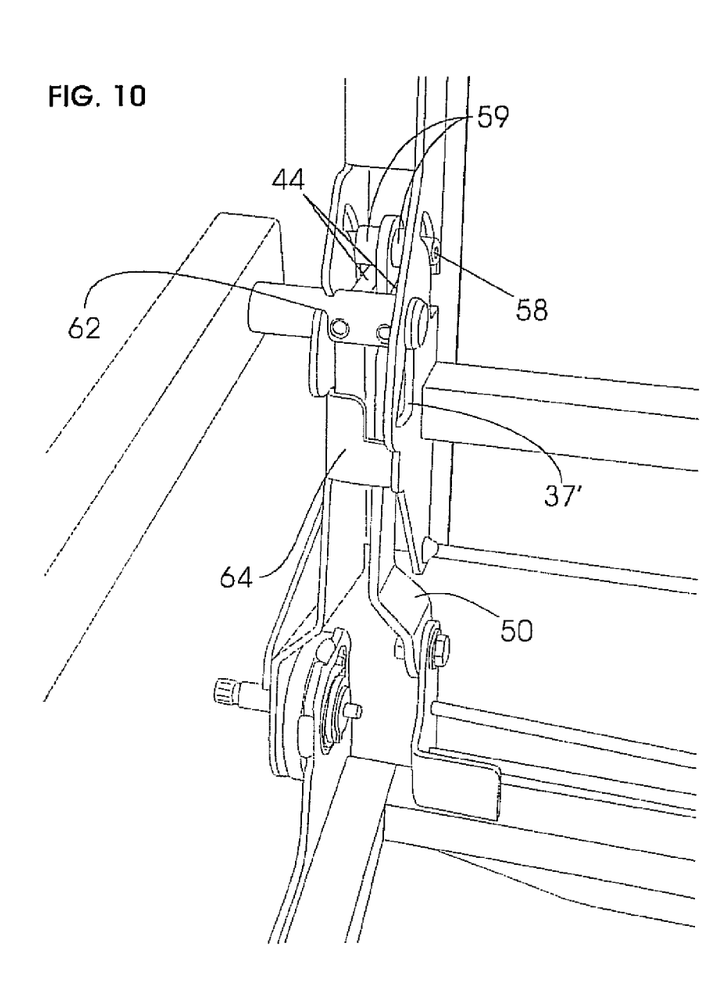
FIG. 10 is a front perspective view of the embodiment of the arm support of FIG. 5 showing the arm in the forward position.
Figure 10A:
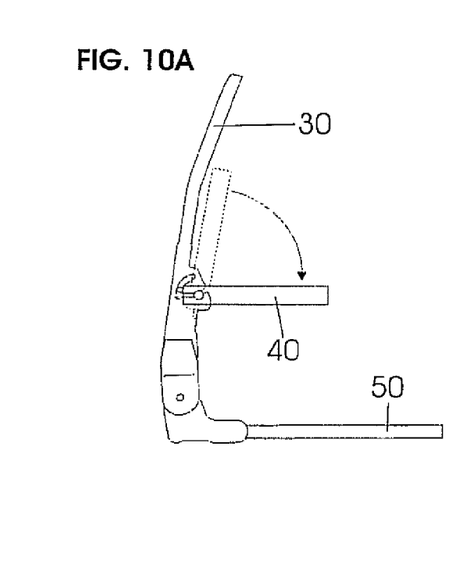
FIG. 10A illustrates the range of motion of the arm and its position in the forward position.

Referring now to FIGS. 9-10A, the arm 40 may then be pulled away from the frame, which allows inside dowel 44 on the arm to slide back inside the arm bracket through the keyhole-shaped slot 37'. This positions the arm in its final upright position, as schematically illustrated in FIG. 9A. The arm may then freely rotate in the upward or downward position. This embodiment of the invention (keyhole slot 37' and slot 62) ensures the arms 40 may be removed in the event a repair is necessary to the arm or when reupholstering is desired.

In a preferred embodiment, the frame may be a plurality of frames having different predetermined lengths, as illustrated, for example, in FIG. 11. A small, medium, or large back may be attached to the seat during manufacture as desired, for example, by order of the customer. The frame back may also include a top portion 36 suitably adapted for receiving a head rest (not shown). Alternatively, the back rest portion 30 of the collapsible recliner may include a frame that can be raised or lowered such that a manufacturer of the recliner can be flexible with respect to the height of the back rest 30. In one non-limiting embodiment (not shown), the frame comprises a bent tubular portion that is held by the back rest portion via a telescoping insertion, as depicted by the directional arrows of FIG. 11. In different embodiments, the frame can be adjusted by the user by immobilizing it at different heights. In other embodiments, the manufacturer immobilizes the back at any given position by way of welding the tubular portion of the back rest portion.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

What is claimed is:

1. A recliner comprising:
    a seat portion;
    an arm;
    a backrest portion having an arm support, the backrest portion is connected to the seat portion at a first pivot, wherein said backrest portion is pivotable relative to the seat portion between a forward position and a backward position; and
    at least one linkage member having a first and a second end, said first end being pivotably connected to said seat portion at a second pivot, and the second end carrying a cross pin for slidable engagement in a path formed in the arm support,
    wherein the arm includes a pin at one end, said arm being connected to said arm support at said one end to define an area of rotation, which includes rotation of the arm about said pin, such that upon simultaneous rotation of the back portion and the linkage member about their respective pivots the arm experiences vertical displacement, but substantially no angular displacement when the backrest is moved between the forward and the backward positions.

2. The recliner of claim 1, wherein the pin includes at least one dowel extending therefrom, said at least one dowel extends under and abuts said cross pin to strengthen support of the arm at all times.

3. The recliner of claim 1, wherein the arm support further includes a cross pin path slot and an arm pin post hole formed therein.

4. A recliner according to claim 1, wherein said recliner comprising two recliners.

5. A recliner according to claim 1, wherein said backrest portion further includes a frame that can be extended to a range of positions.

6. A recliner according to claim 1, wherein said backrest portion comprises a small, medium, or large sized back.

7. A self-leveling arm assembly for use with an article of furniture that includes a back rest portion having an arm support, the back rest portion being connected to a seat portion at a first pivot, wherein said backrest portion is pivotable relative to the seat portion between a forward position and a backward position, the assembly comprising:
    an arm; and
    at least one linkage member having a first and a second end, said first end adapted to be pivotably connected to said seat portion, and the second end carrying a cross pin for slidable engagement in a path formed in the arm support,
    wherein the arm includes a pin at one end, said arm adapted to be connected to said arm support at said one end to define an area of rotation, which includes rotation of the arm about said pin so that upon simultaneous rotation of the back portion and the linkage member about their respective pivots, the arm experiences vertical displacement, but substantially no angular displacement when the backrest is moved between the forward and the backward positions.

8. An assembly according to claim 7, wherein said backrest portion comprises a small, medium, or large sized back.

9. A self-leveling arm assembly according to claim 7, wherein the article of furniture is a chair.

10. The assembly of claim 7, wherein the pin includes at least one dowel extending therefrom, said at least one dowel extends under and abuts said cross pin to strengthen support of the arm at all times.

11. The assembly of claim 7, wherein said linkage member includes a notch between the first and second ends, said notch cradles said pin when the backrest is in the backward position to further strengthen support of the arm.

12. The assembly of claim 7, wherein the arm support further includes a cross pin path slot and an arm pin post hole formed therein.

13. A assembly according to claim 7, wherein said assembly comprising two recliner assemblies.

14. An assembly according to claim 13, wherein said backrest portion further includes a frame that can be extended to a range of positions.

* * * * *